UNITED STATES PATENT OFFICE.

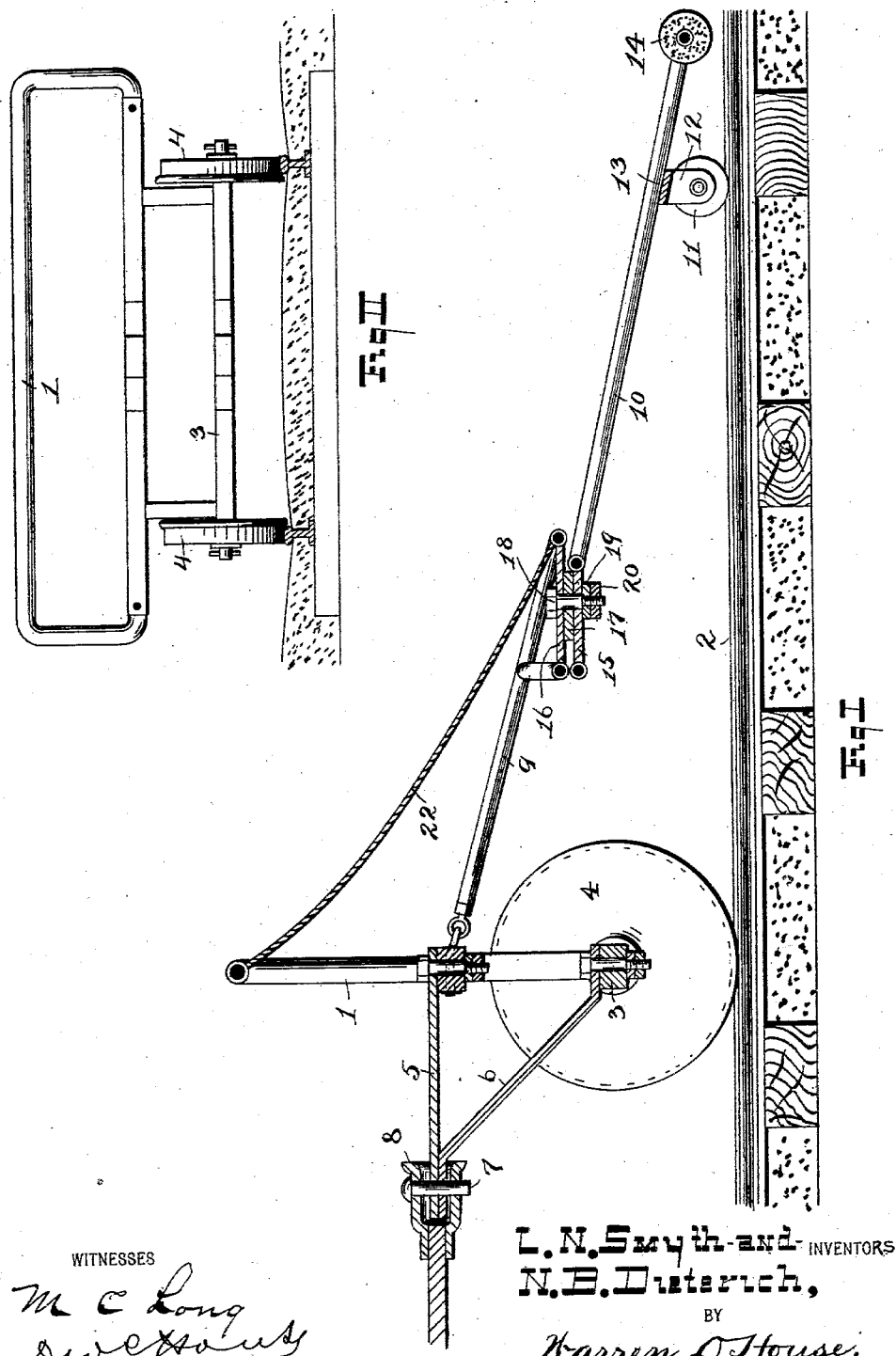

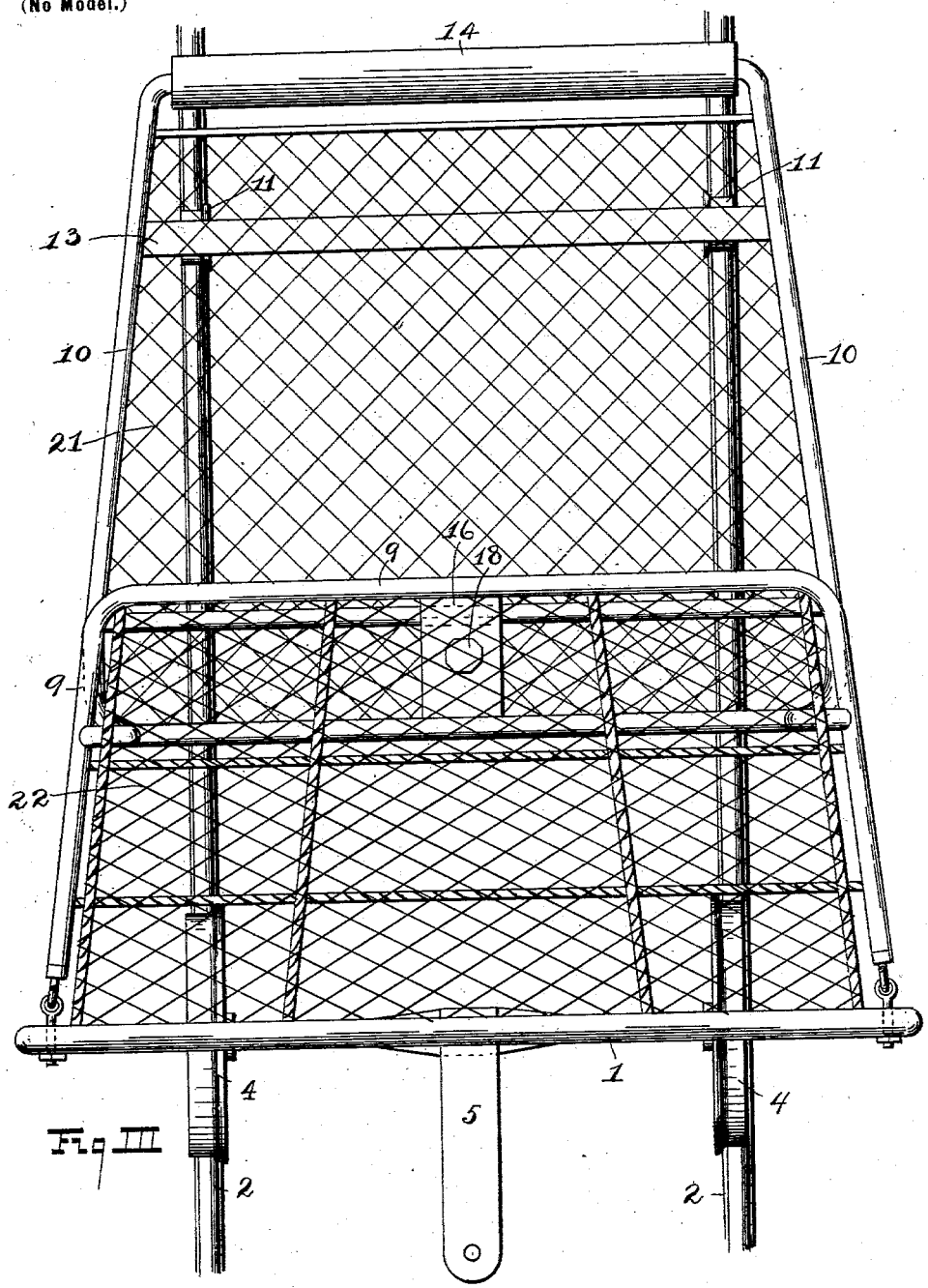

LOUIS N. SMYTH AND NEIL B. DIETERICH, OF KANSAS CITY, MISSOURI.

STREET-CAR FENDER.

SPECIFICATION forming part of Letters Patent No. 634,508, dated October 10, 1899.

Application filed January 26, 1899. Serial No. 703,496. (No model.)

*To all whom it may concern:*

Be it known that we, LOUIS N. SMYTH and NEIL B. DIETERICH, citizens of the United States of America, residing in Kansas City, in the county of Jackson and State of Missouri, have invented a new and useful Improvement in Street-Car Fenders, of which the following is a specification, reference being had therein to the accompanying drawings.

Our invention relates to improvements in street-car fenders.

Our invention aims to provide a fender that will surely and safely pick a person from the track and at the same time prevent injury to him from contact with any portion of the fender.

Another object of our invention is to provide a fender which is simple in construction, readily applied to any car, inexpensive to manufacture, not liable to get out of order, and when injured may be quickly repaired at small cost.

Our invention provides, further, a fender which shall follow the track closely throughout its curves and grades.

Our invention provides also a car-fender comprising a plurality of sections so connected as to be capable of lateral and vertical flexing, whereby the fender will closely retain its relative position with relation to the track regardless of its undulations or lateral curves.

Our invention consists, further, in certain novel features of construction hereinafter fully described and claimed.

In the accompanying drawings, which illustrate our invention, Figure I represents a vertical longitudinal sectional view. Fig. II represents a rear elevational view of the vertical portion of the fender. Fig. III represents a top view.

The fender is composed of three principal parts—the rear vertical portion and the two forward-inclined portions. The rear part is a vertical frame 1, made of piping or other suitable material. The frame 1 is disposed transversely with respect to the track 2 and may be of any suitable conformation. It is provided with an axle 3, upon the ends of which are rotatably mounted the rear carrying-wheels 4, adapted to run on the track-rails.

Rearwardly extending from the center of the frame 1, to which it is pivoted, is a horizontal link 5. Rearwardly and upwardly extending from the axle 3 is another link 6, the forward end of which is pivoted to the axle, and the rear end, as well as the rear end of the link 5, is provided with a vertical hole adapted to receive a coupling-pin 7, with which the car draw-head 8 is provided.

Pivoted to the forward side of the frame 1, near its center, and so as to swing vertically is the rear forwardly-inclined portion 9, comprising a U-shaped frame, preferably of piping, and to the forward end of which is pivoted so as to swing laterally the rear end of the forward-inclined portion 10 of the fender.

The forward end of the fender is supported by two small wheels 11, adapted to run on the track-rails. These two wheels are rotatably mounted upon the arms 12, extending downward from the under side of a transverse bar 13, which is secured to the two side arms of the forward-inclined part 10. Upon the extreme forward transverse portion of the section 10 is mounted a large buffer 14, preferably of soft rubber. This buffer protects any one who is struck by the front part of the fender from injury.

It is preferable to have the front and rear inclined portions of the fender so pivoted together that the forward end or section shall swing in a plane parallel to the track. Where the framework of the sections is composed of piping, as shown in the drawings, this may be accomplished as follows: The rear end of the forward section 10 is horizontally disposed and has secured rigidly to it a horizontal plate 15, which lies below and parallel to a similarly-disposed plate 16, secured to the forward part of the section 9. The plates 15 and 16 are separated by a washer 17 and are held in their respective relative positions by means of a bolt 18, preferably shouldered and provided with suitable securing-nuts 19 and 20. The forward section 10 is provided with suitable netting 21 to catch any person or animal falling thereon. Over the rear section 9 a netting 22 is also stretched, the forward end of which is secured to the forward end of the section 9, and the rear end is secured to the upper end of the vertical section 1. The links 5 and 6 may be pivotally secured to other portions of the car, if desired, than to the draw-head.

In operating our invention it is coupled to the forward end of the car. The forward wheels 11 follow the track, always holding the forward end of the fender at the same relative position relative to the rails. The pivoting of the forward and rearward inclined sections together permits the two parts to swing laterally relatively to each other. The pivoting of the section 9 to section 1 in the manner described permits the forward portion of the fender to always retain its proper position relative to the track. The lateral motion of the forward end of the car when rounding curves does not disturb the proper position of the fender for the reason that the links 5 and 6 are adapted to swing laterally at both their forward and rearward ends. If anything be struck by the fender, it will fall upon the netting and remain there uninjured until removed. When not in use, the forward portion of the fender may be swung upon its hinged connection with the vertical section into a vertical position.

We do not limit our invention to the precise form of framework illustrated, as it is obvious that this may be varied considerably without departing from the spirit of our invention.

Having thus described our invention, what we claim, and desire to secure by Letters Patent, is—

1. In a car-fender, the combination with the rear section adapted to be connected with the car and provided with carrying-wheels adapted to travel upon the track, of two forward sections hinged together so as to swing laterally relatively to each other, one of the forward sections being hinged to the rear section so as to swing vertically, and means for preventing much lateral or vertical movement of the forward end of the forward section relative to the track, substantially as described.

2. In a car-fender, the combination with the rear section adapted to be connected with the car and provided with carrying-wheels adapted to travel upon the track, of two forward sections hinged together so as to swing laterally relatively to each other, one of the forward sections being hinged to the rear section so as to swing vertically, and carrying-wheels adapted to travel upon the track and supporting one of the forward sections, substantially as described.

3. In a car-fender, the combination with the rear section provided with carrying-wheels adapted to travel upon the track, of two forward sections, one of which is supported and guided by the track, hinged together so as to swing laterally relatively to each other, one of the forward sections being hinged to the rear section so as to swing vertically, and a link connected to the rear section and adapted to be connected to the car, substantially as described.

4. In a car-fender, the combination with the rear section provided with carrying-wheels adapted to travel upon the track, of two forwardly-inclined sections, of means for hinging the said two inclined sections together so that the forward one of the sections shall swing laterally in a plane parallel to the track, the rearward one of said inclined sections being hinged to the rear section so as to swing vertically, substantially as described.

5. A car-fender comprising three sections, the forward and center sections being hinged together so as to swing laterally, and the center and rear sections being hinged together so as to swing vertically, carrying-wheels adapted to travel upon the track for supporting the forward and rear ends of the fender and means for connecting the rear end of the fender with the car whereby the lateral movement of the car will not be communicated to the fender, substantially as described.

6. A car-fender comprising a rear vertical and two forwardly-inclined sections, means being provided whereby the forward-inclined section may swing laterally in the plane parallel to the track, the center section being hinged to the rear section so as to swing vertically, carrying-wheels for supporting the fender upon the track, and a link for connecting the rear section with the car, substantially as described.

In testimony whereof we have affixed our signatures in presence of two witnesses.

LOUIS N. SMYTH.
NEIL B. DIETERICH.

Witnesses:
WARREN D. HOUSE,
D. W. C. HOUSE.